(12) United States Patent
Kinoshita

(10) Patent No.: US 7,055,394 B2
(45) Date of Patent: Jun. 6, 2006

(54) HANDLEBAR STEM AND SPEED INDICATOR

(75) Inventor: Osamu Kinoshita, Sakai (JP)

(73) Assignee: Cateye Co., Ltd., Osaka (JP)

( * ) Notice: Subject to any disclaimer, the term of this patent is extended or adjusted under 35 U.S.C. 154(b) by 95 days.

(21) Appl. No.: 10/779,914

(22) Filed: Feb. 17, 2004

(65) Prior Publication Data

US 2004/0163479 A1     Aug. 26, 2004

(30) Foreign Application Priority Data

Feb. 21, 2003   (JP)   ............... 2003-043895

(51) Int. Cl.
*G01N 3/02*    (2006.01)

(52) U.S. Cl. .............. 73/856; 340/432; 340/439; 340/441; 368/10; 324/160; 73/493; 73/495

(58) Field of Classification Search ............... 73/493; 340/432; 368/10
See application file for complete search history.

(56) References Cited

U.S. PATENT DOCUMENTS

| | | | | |
|---|---|---|---|---|
| 2,168,939 A | | 8/1939 | Kraeft | ................ 177/7 |
| 4,435,983 A | * | 3/1984 | Shimano | ................ 73/493 |
| 4,489,307 A | | 12/1984 | Nagano | ................ 340/134 |
| 4,780,864 A | * | 10/1988 | Houlihan | ................ 368/10 |
| 6,204,752 B1 | * | 3/2001 | Kishimoto | ................ 340/432 |
| 6,430,040 B1 | | 8/2002 | Masui | ................ 361/683 |

FOREIGN PATENT DOCUMENTS

| | | |
|---|---|---|
| EP | 1065140 | 1/2001 |
| FR | 2654698 | 6/1991 |
| GB | 1591012 | 6/1981 |
| JP | 9-024889 | 1/1997 |
| JP | 10-007049 | 1/1998 |
| JP | 11-001191 | 1/1999 |

* cited by examiner

*Primary Examiner*—Max Noori
*Assistant Examiner*—Linda P. Field
(74) *Attorney, Agent, or Firm*—Olson & Hierl, Ltd.

(57) ABSTRACT

There can be obtained a handlebar stem ensuring that a speed indicator provides a readily observable indication and in addition thereto capable of achieving a reduction in size and weight. A handlebar stem attaching a bicycle's handlebar includes a rod attaching the handlebar stem to the bicycle; a speed indicator receiving a signal from a speed sensor to display speed; and an indicator housing located at a front protrusion extending in a forward direction to traverse the rod to house the speed indicator, the indicator housing, as seen along the rod, overlapping or being adjacent to the rod.

5 Claims, 9 Drawing Sheets

HANDLEBAR STEM AND SPEED INDICATOR

BACKGROUND OF THE INVENTION

1. Field of the Invention

The present invention relates to a handlebar stem and a speed indicator for bicycles.

2. Description of the Background Art

In FIG. 10, on an end of a forward-projecting part of a handlebar stem 120 of this bicycle, a handlebar 138 is held. At a position which is located on the upper surface of the forward-projecting part of handlebar stem 120 and is readily visible from the rider, an indicator-housing recess 134 is provided, and an indicator 135 displaying the speed and the like is fit in this indicator-housing recess 134. A lead (or cord) 149 extending from the indicator passes through a hollow longitudinal rod 121 and a head tube 107 for example to be connected to a sensor 116. Sensor 116 is formed of a device sensing a magnetic field and thus senses a magnetic flux when a small permanent magnet 115 turns to pass near sensor 116. Although lead 149 passes through within longitudinal rod 121 in order not to be visible from the outside, lead 149 may be wound around head tube 107 so as to be visible from the outside.

FIG. 11 is a cross-sectional view along line XI—XI in FIG. 10. Handlebar stem 120 as shown includes hollow longitudinal rod 121 having its lower part inserted into the head tube of the bicycle, forward-projecting part 122 extending forward from the upper end of longitudinal rod 121, and a handlebar holding part 123 provided at the front end of forward-projecting part 122. Handlebar holding part 123 has a through-hole 139 for passing handlebar 138 therethrough, so that handlebar 138 can be passed through the through-hole 139 to be fixed to forward-projecting part 122 of handlebar stem 120.

Handlebar stem 120 has an insert member 124 which is inserted through the lower end of longitudinal rod 121 and moved upward so as to fix longitudinal rod 121 to a front fork stem of the bicycle. Handlebar stem 120 further has a lifting rod 126 extending through longitudinal rod 121 and insert member 124 for moving insert member 124 upward.

Insert member 124 which is screwed onto an external thread of the lifting rod engages with the lifting rod and longitudinal rod 121 in such a manner that the lifting rod is not easily rotated. Rotation of the lifting rod thus causes the insert member to move upward and accordingly expand the lower end of the longitudinal rod. Then, the longitudinal rod has the expanded lower end with the outer surface accordingly opened and is thus fixed to the front fork stem.

Forward-projecting part 122 is preferably flat-shaped and has its upper surface provided with recess 134. Indicator 135 indicating the speed and the like is housed in this recess 134. The lower surface of recess 134 has a fixing hole 136 which passes therethrough to reach the lower surface of forward-projecting part 122. Fixing hole 136 is used for fixing indicator 135 to recess 134. Specifically, as shown in FIG. 7, a fixing screw 137 is inserted into fixing hole 136 from below forward-projecting part 122 and screwed in an internal thread on the bottom wall of the indicator. The fixing screw is thus screwed to fix the indicator to recess 134.

Indicator 135 has its body in which a battery is housed for supplying electric power for a liquid-crystal display and a semiconductor device performing various operations. Lead 149 drawn from the indicator is passed through a through-hole made along the axis of the lifting rod and connected via a connector in the head tube (not shown) for example to a lead extended from the sensor of a speedometer or the like. (See for example Japanese Patent Laying-open Nos. 9-24889, 10-7049 and 11-1191.)

With the above-discussed structure, the rider can check the speed, the traveled distance and the like that are displayed on the indicator while riding the bicycle.

However, there still exists a continuing demand for a handlebar stem with reduced size and weight, and there is also a demand that the above described, speed indicator equipped handlebar stem ensure readily observable speed indication as well as be reduced in size and weight. Furthermore as another object there is a demand for a ready and reliable method of attaching the speed indicator.

One object of the present invention, as most broadly described, is to provide a handlebar stem ensuring that a speed indicator provides a readily observable indication and in addition thereto capable of achieving a reduction in size and weight. Another object of the present invention, as contemplated by a particular invention, is to provide a handlebar stem equipped with a readily, reliably attachable speed indicator.

SUMMARY OF THE INVENTION

The present invention provides a handlebar stem attaching a handlebar of a bicycle. The handlebar stem includes: a rod attaching the handlebar stem to the bicycle; a speed indicator receiving a signal from a speed sensor to display speed; and an speed indicator housing located at a front protrusion extending in a forward direction to traverse the rod to house the speed indicator. The speed indicator housing, as seen along the rod, overlaps or is adjacent to the rod.

As the speed indicator housing and the rod overlap or are adjacent to each other, the speed indicator's display size can be ensured and in addition thereto the handlebar stem's front protrusion can have a reduced length protruding forward. As a result the handlebar stem can be reduced in size and weight. Note that the rod may be formed by press-fitting a handlebar post in the form of a tube for example of stainless steel into the handlebar stem's elongate, hollow portion for the integration of them. In that case, the rod is formed of the elongate, hollow portion and the handlebar post. Furthermore, the rod may be a portion of a handlebar stem including a handlebar post of the same material as the handlebar stem and molded and thus produced integral with the handlebar stem.

Furthermore a handlebar holder holding the handlebar and the speed indicator housing can be adjacent to each other and male and female screws fastening the handlebar held by the handlebar holder can be obliquely arranged to traverse the forward direction.

The handlebar and the speed indicator are not spaced apart. The front protrusion can be reduced in size. Furthermore, obliquely arranging male and female screws ensures the screws' length and hence a force to fasten the handlebar if the handlebar holder is reduced in size.

Furthermore the speed indicator may be bonded to the speed indicator housing with an adhesive. The speed indicator can readily be secured to the speed indicator housing.

Furthermore the speed indicator housing may have a protrusion to engage with and secure the speed indicator and the speed indicator may have a nail elastically deformed to engage with the protrusion.

If the adhesive degrades and if adhesion is reduced, the speed indicator can still be prevented from slipping off.

The speed indicator may include a main body having an interconnect substrate and an indication unit, and a battery housing removable from the main body, the speed indicator housing may have a through-hole opening downward, the battery housing may be arranged through the through-hole and protrude therefrom downward, and the through-hole may have an edge provided with a guiding tapered portion helping to use a tool in the form of a pin to push upward a push button switch provided at a bottom surface of the main body while the speed indicator is housed.

This allows the speed indicator to be readily adjusted, reset and started, and also prevents the push button switch from being readily pressed by a cause of disturbance.

The present invention provides a speed indicator that is attached to a handlebar stem of a bicycle. The speed indicator is formed of a main body including an interconnect substrate and a liquid crystal display unit, and a battery housing removable from the main body, and any button switch of the main body that is externally operated is arranged only at a bottom surface of the main body.

This prevents a set condition of the speed indicator from being changed readily at a front side for example by a cause of disturbance. As a result, the speed indicator can display speed accurately over a long period of time under a predetermined set condition.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
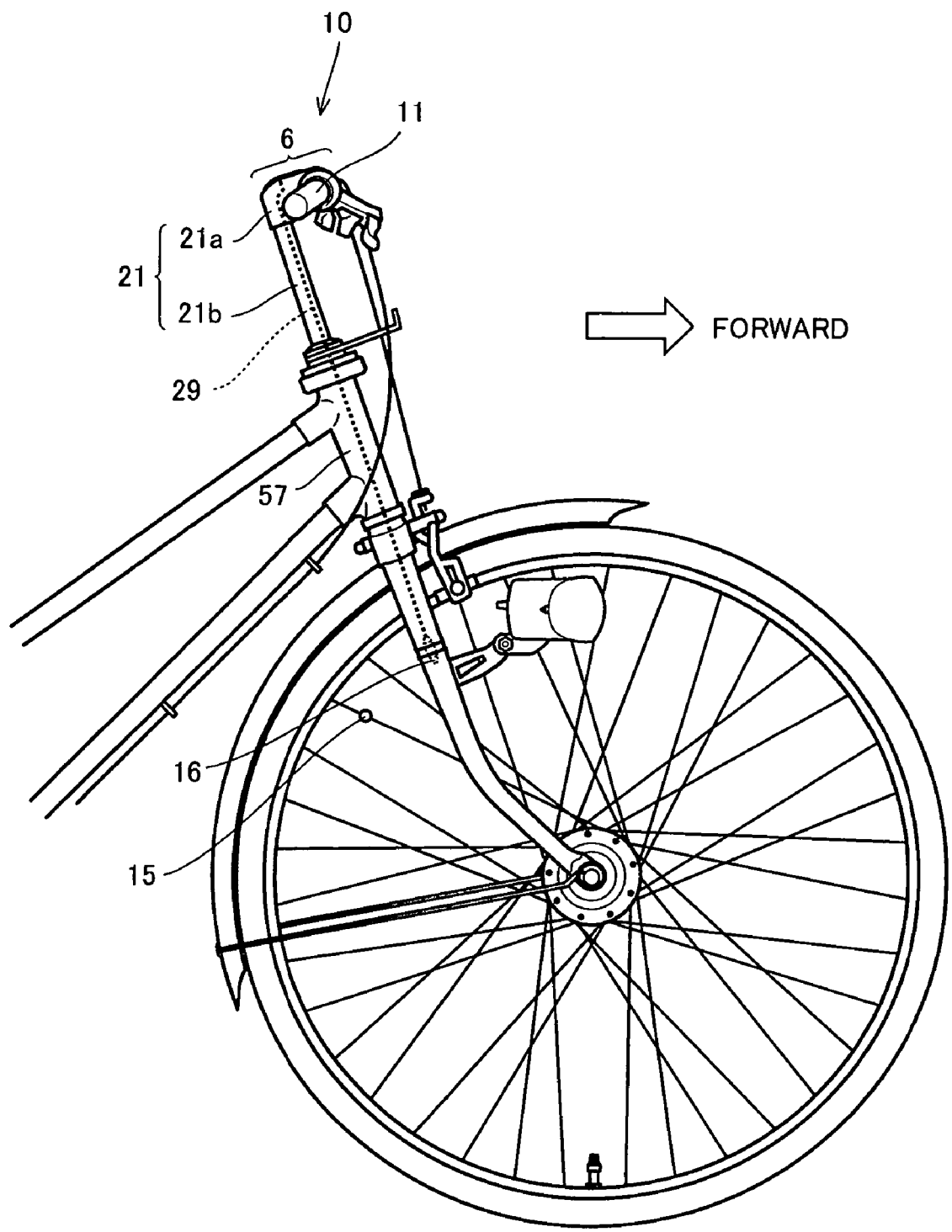
FIG. 1 shows a bicycle having attached thereto a handlebar stem of the present invention in an embodiment.

Reference will now be made to the figures to describe the present invention in embodiment. In FIG. 1 a handlebar stem 10 has a front protrusions 6 having an end with a handlebar 11 attached thereto. Front protrusion 6 is traversed by a rod 21 formed of an elongate, hollow portion 21a cast integrally as the handlebar stem and a handlebar post 21b press-fitted into elongate, hollow portion 21a. The handlebar stem is formed for example by integral casting of aluminum alloy (Al—Si—Mg based) and elongate, hollow portion 21a receives handlebar post 21b formed in a tube for example of stainless steel press-fitted thereinto. While in the present embodiment the rod is formed of two components connected together, as described above, it may be formed of aluminum alloy also including the handlebar post integrally.

Rod 21 is inserted into a head tube 57. Inside head tube 57 a speed sensor 16 is arranged to inform a speed indicator whenever a magnet 15 passes by the sensor. Inside the head tube a lead is arranged to transmit the signal to the speed indicator. The speed indicator includes a main body, which uses the signal to calculate speed.

Figure 2:
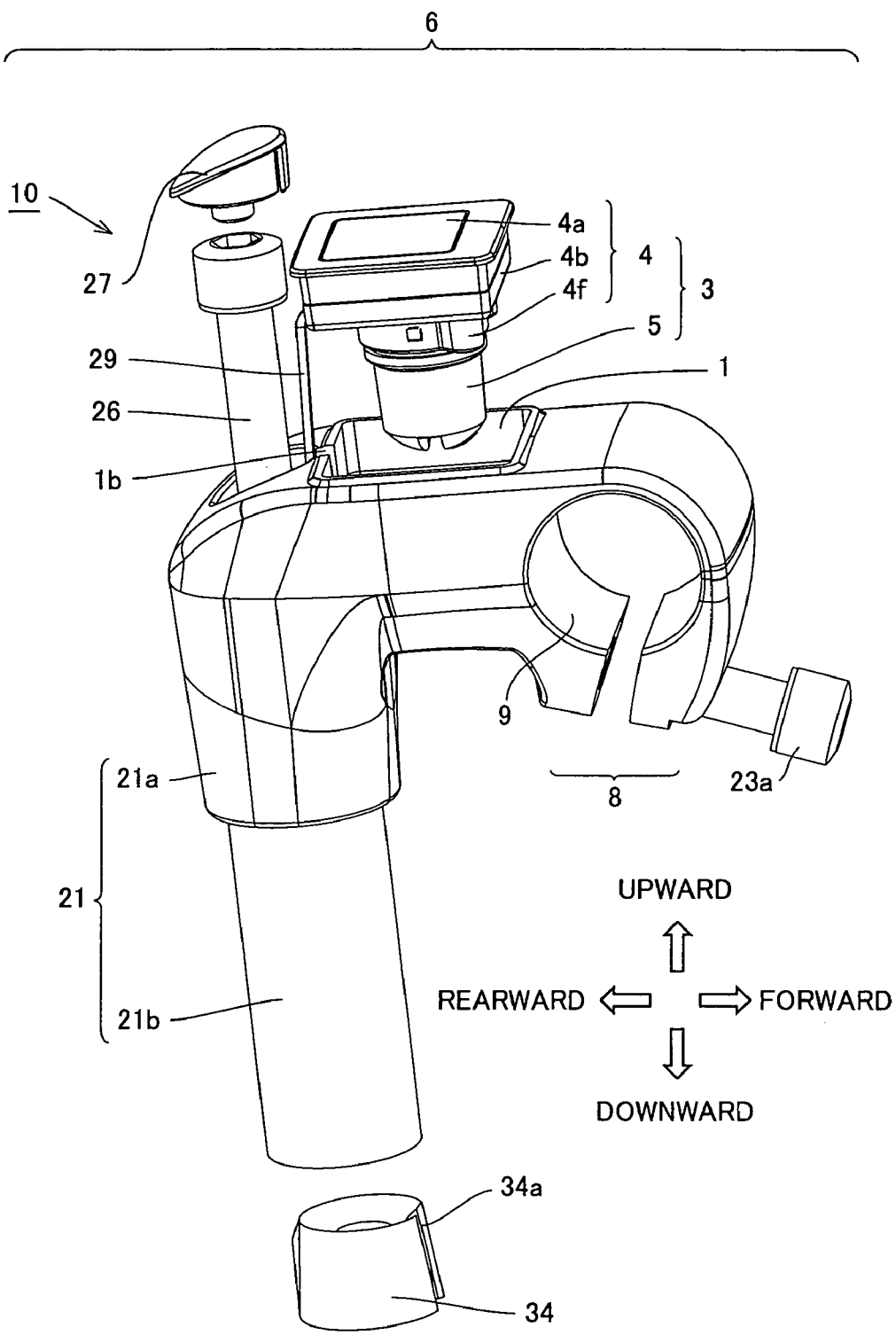
FIG. 2 is an exploded perspective view of a handlebar stem of the present invention in an embodiment.

With reference to FIG. 2, handlebar stem 10 is generally formed of front protrusion 6 and rod 21 traversing the front protrusion and extending downward. Front protrusion 6 has an end provided with a handlebar holder 8 having a handlebar receiving hole 9 receiving a handlebar. Handlebar holder 8 is provided with a screw 23a fastening the handlebar inserted into hole 9. Screw 23a is an externally threaded screw. The screw is screwed into a portion, which is of course internally threaded. By screwing the externally threaded screw into the internally threaded screw the handlebar inserted into the handlebar receiving hole is circumferentially fastened and thus secured. In the present embodiment this screw is not parallel to front. Rather, it is arranged obliquely so that if the handlebar holder has a length reduced in the forward direction a sufficient length can still be ensured for the externally and internally threaded screws to mate to fasten the handlebar with an increased force. That is, the screw's oblique position ensures sufficient force to fasten the handlebar and allows the handlebar holder to be reduced in size and weight.

Front protrusion 6 has an upper surface provided with a speed indicator housing 1. Speed indicator housing 1 is stepped and at the center has through-hole extending downward. Speed indicator housing 1 houses a speed indicator 3 including a battery housing 5 and a main body 4. The main body 4 is held by a step 1s and battery housing 5 is arranged through the through-hole to protrude downward. The main body 4 includes an interconnect substrate and liquid crystal display device (not shown), as well as a transparent plate forming an upper surface 4a, a bottom portion 4b bonded to the step 1s, and a push button switch 4f located at the bottom portion and facing downward.

Handlebar stem 10 at a rear portion thereof has elongate, hollow portion 21a traversing front protrusion 6 and extending downward. Elongate, hollow portion 21a receives a tube 21b, forming a handlebar post, as described above, press-fitted therein. Elongate, hollow portion 21a and handlebar post 21b together form rod 21. Into rod 21 a bar to be pulled up 26 is inserted from the rod 21 upper end and has its lower end fitted into a member 34 as the bar is screwed thereinto, and member 34 is drawn upward into the rod to fit into its lower end. Bar 26 can be regarded as a long bolt passing through rod 21 and secured at the rod's upper and lower ends, and has an upper end covered with a rubber cap 27.

From the speed indicator a lead 29 is extracted and extends past a recess 1b provided at a rear end of housing 1 to pass the lead and is drawn into between bar 26 and rod 21. Lead 29 further extends along a groove 34a extending in a side portion of member 34 and is connected to speed sensor 16. Member 34 does not rotate as rod 21 rotates, as described above, so that the lead will not be twisted.

Figure 3:
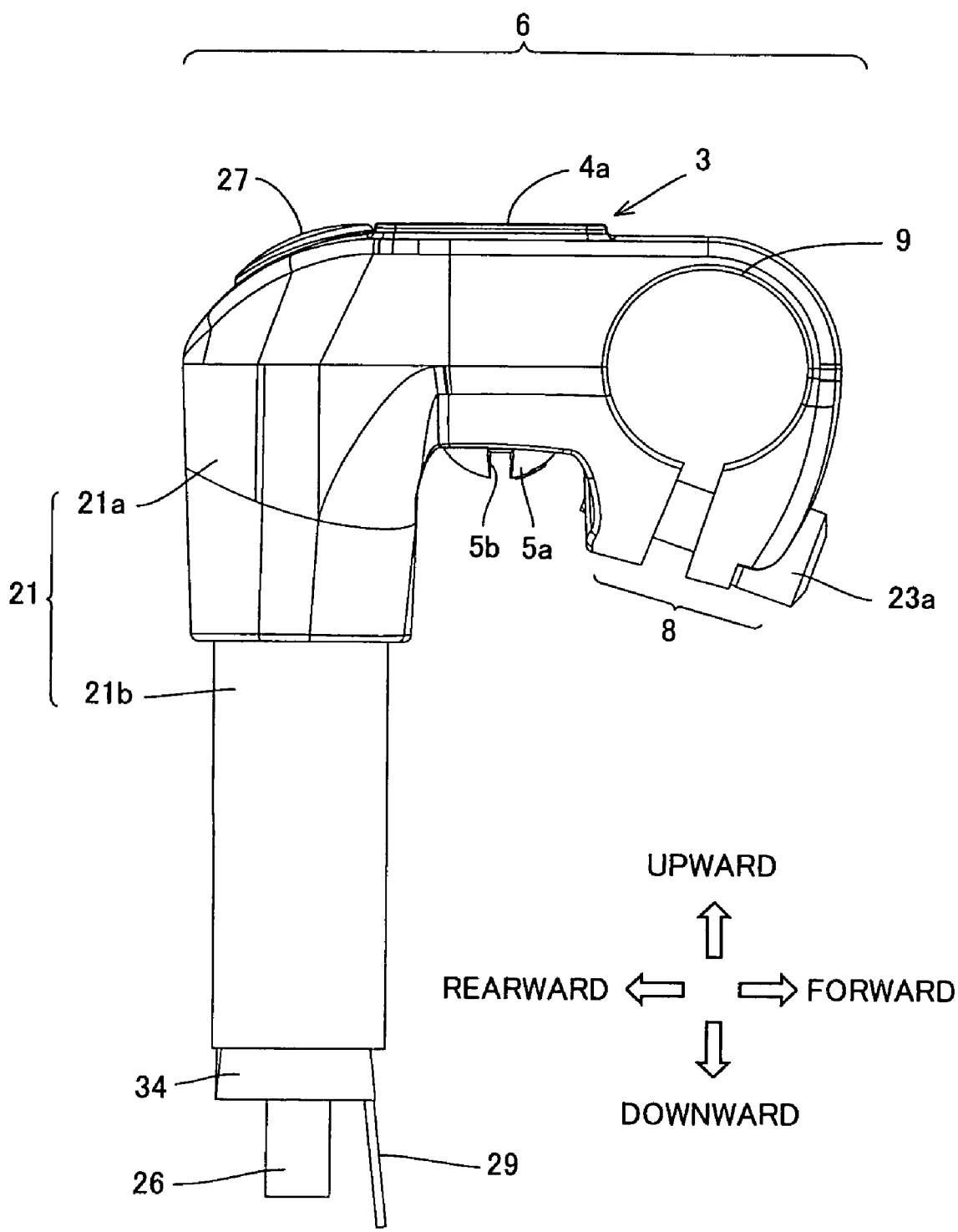
FIGS. 3–6 are side, top and bottom views and a partial cross section, respectively, of the FIG. 2 handlebar stem.

With reference to FIG. 3 the rod 21 upper portion or elongate, hollow portion 21a and speed indicator 3 partially overlap as seen along rod 21. In other words, they overlap in arrangement. Rod 21 has a center through which the bar to be pulled up 26 is inserted, as has been described previously, and the bar's upper end is stopped. As such, the speed indicator cannot be arranged rearward to traverse the rod's central axial line. In the FIG. 3 handlebar stem, however, the speed indicator, as seen along the rod, is located in the front protrusion rearward so that it partially overlaps the elongate, hollow portion's front side. This can also be confirmed from the fact that rubber cap 27 fitted into the elongate, hollow portion's upper end to cover the bar's upper end contacts the speed indicator's main body 4. It can be said that the speed indicator is located in the front protrusion as rearward as possible. Rather than arranging the elongate, hollow portion and the speed indicator to overlap each other, as described above, arranging them adjacently can of course also reduce the front protrusion, as described above. Note that when the elongate, hollow portion and the speed indicator are adjacently arranged, the rod and the speed indicator housing are arranged so adjacently that between the rod's contour and the housing's contour there does not exist a gap exceeding the thickness of a portion surrounding the elongate, hollow portion's bore. As such, when they are adjacently arranged, there may exist between the rod's contour and the housing's contour a gap approximately of the thickness of a portion surrounding the elongate, hollow portion's bore.

Furthermore, handlebar holder 8 forms a front end of the front protrusion and the speed indicator's main body 4 and handlebar holder 8 are adjacent to each other, as seen in a plane. As such in the FIG. 3 handlebar stem at the front protrusion the speed indication unit is located so rearward as to introduce the aforementioned overlap, and the handlebar holder is also located so rearward as not to introduce a gap between the handlebar holder and the upper surface 4a of the main body 4. Thus the FIG. 3 handlebar stem ensures that the speed indicator provides readily observable indication, and also pursues a reduced length of the front protrusion. As a result the handlebar stem can be reduced in size and weight.

As shown in FIG. 3, the speed indicator's battery housing extends through and thus penetrates the handlebar stem downward. The battery housing has a lower end 5a provided with a recess 5b receiving a coin or the like to be turned to facilitate detachable attachment.

Figure 4:
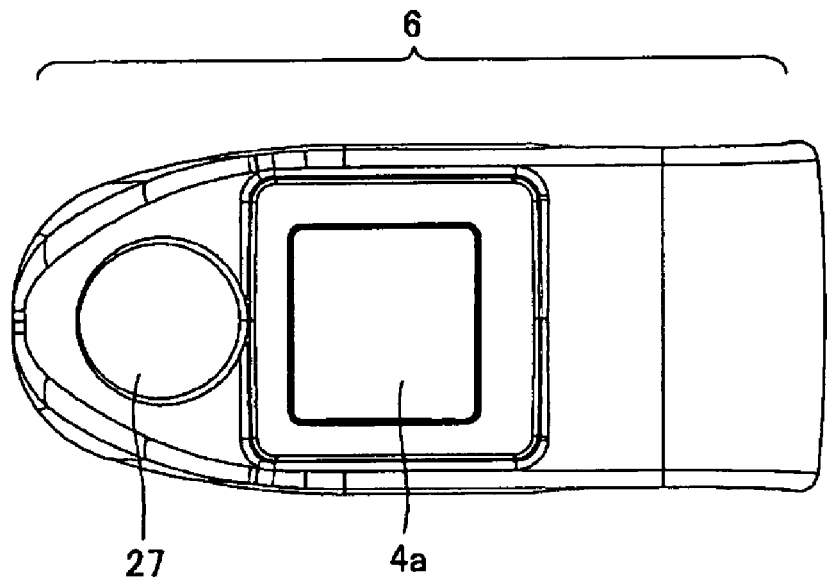

With reference to FIG. 4, the speed indicator includes the upper surface 4a of main body 4 including a transparent plate, the main body including an interconnect substrate, a liquid crystal display unit and the like located therebelow, and the battery housing.

Figure 5:
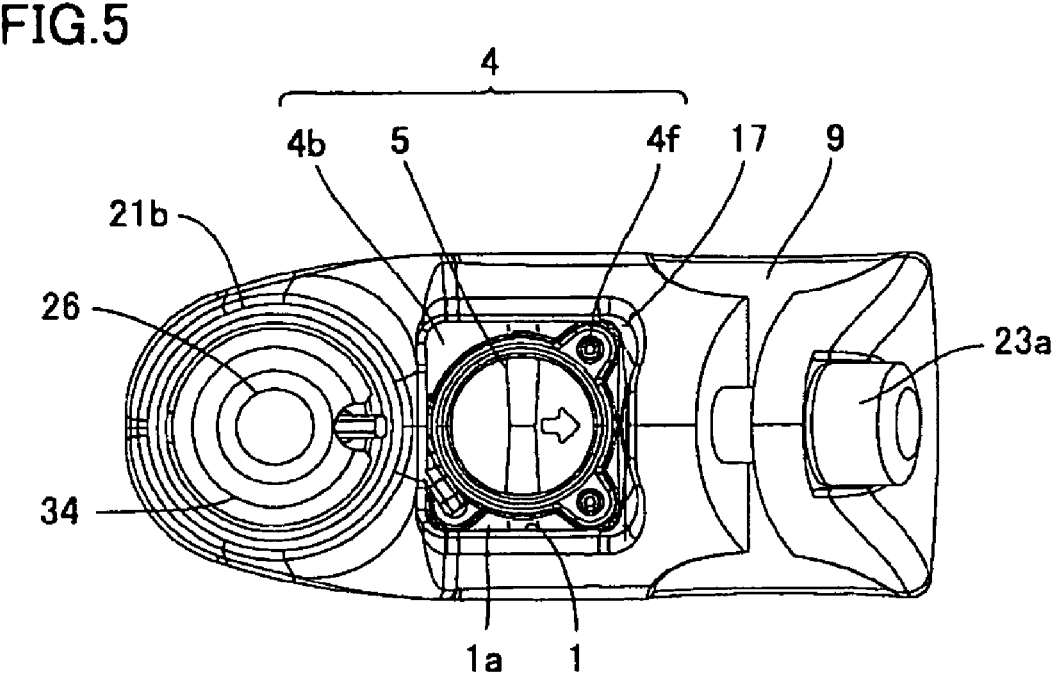

In FIG. 5, the speed indicator's main body 4 is fitted into the housing 1 recess and the main body's bottom portion and the recess's bottom surface are bonded together with an adhesive and thus fixed. The battery housing has a nail (not shown) engaging and stopping a battery casing. By this nail, the battery housing is engaged from downward of a through-hole with a mating portion of the bottom portion of the main body and detachably attached as desired.

The main body has a bottom surface with push button switch 4f pushed in upward with a stick in the form of a pin and thus switched. To help to push in switch 4f with the stick in the form of a pin, an opening 1a has an edge, a corner in particular, provided with a guiding tapered portion 17. The tapered portion expands, as seen in cross section, as it extends downward. A user can insert a tip of a pen, a driver or the like from below the handlebar stem into taper portion 17 and use the driver or the like to readily press the push button for switching. In the present embodiment the speed indicator does not have such push button switches arranged on the front side of the speed indicator. They are located on the bottom side of the handlebar stem 10 at a deep location as seen externally. As such, they are not readily pressed unintentionally. Consequently, a prescribed set condition can be maintained for a long period of time constantly.

Figure 6:
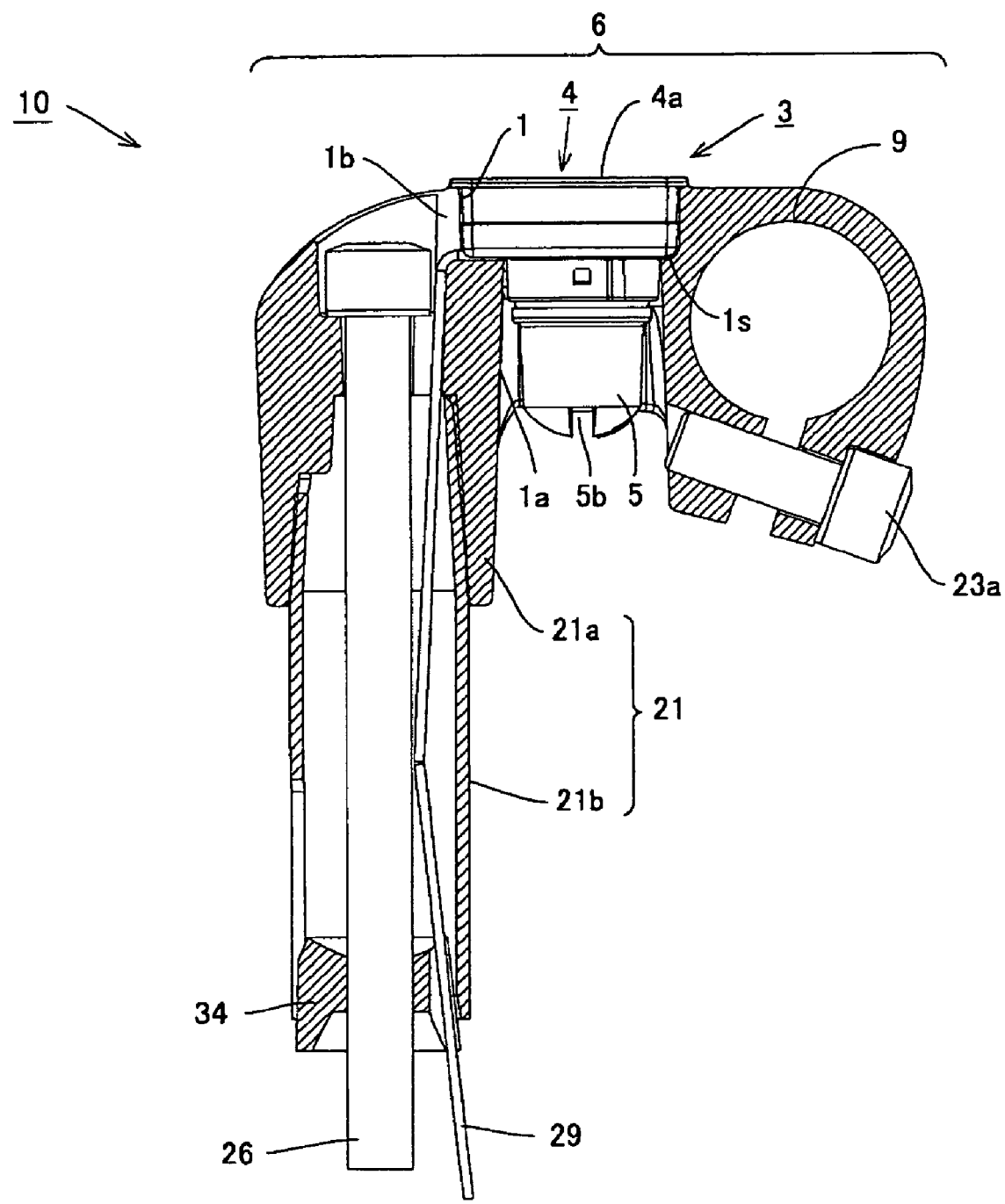

It can be seen from FIG. 6 that the rod's elongate, hollow portion 21a and speed indicator housing 1 partially overlap as seen along rod 21. It is also apparent why the speed indicator housing 1 cannot be drawn back to a position traversing the rod's central axis line, since the speed indicator housing 1 drawn back to the position traversing the rod's central axial line would prevent bar 26 from being pulled up. Furthermore, it is also apparent that the speed indicator housing 1 front portion and the handlebar holder 8 are adjacent to each other, as seen in a plane.

Thus in the handlebar stem 10 the front protrusion 6 can significantly be reduced to have a significantly reduced size and weight. Furthermore, the handlebar stem 10 can be formed of reduced material and hence at a reduced cost. As an exemplary size and weight reduction, when a handlebar stem conventionally having a width of 39.2 mm, a length of 64.0 mm and a mass of 215 grams was fabricated with the same speed indicator arranged, as described in the present embodiment, a significantly reduced width, length and mass of 36.6 mm, 51.7 mm and 140 grams, respectively, were achieved.

Furthermore, the FIG. 6 speed indicator 3 is bonded to the speed indicator housing 1 with an adhesive at the main body 4 bottom and side surfaces. The speed indicator 3 can thus be readily secured to the speed indicator housing 1. Consequently it can be produced at reduced cost.

Figure 7:
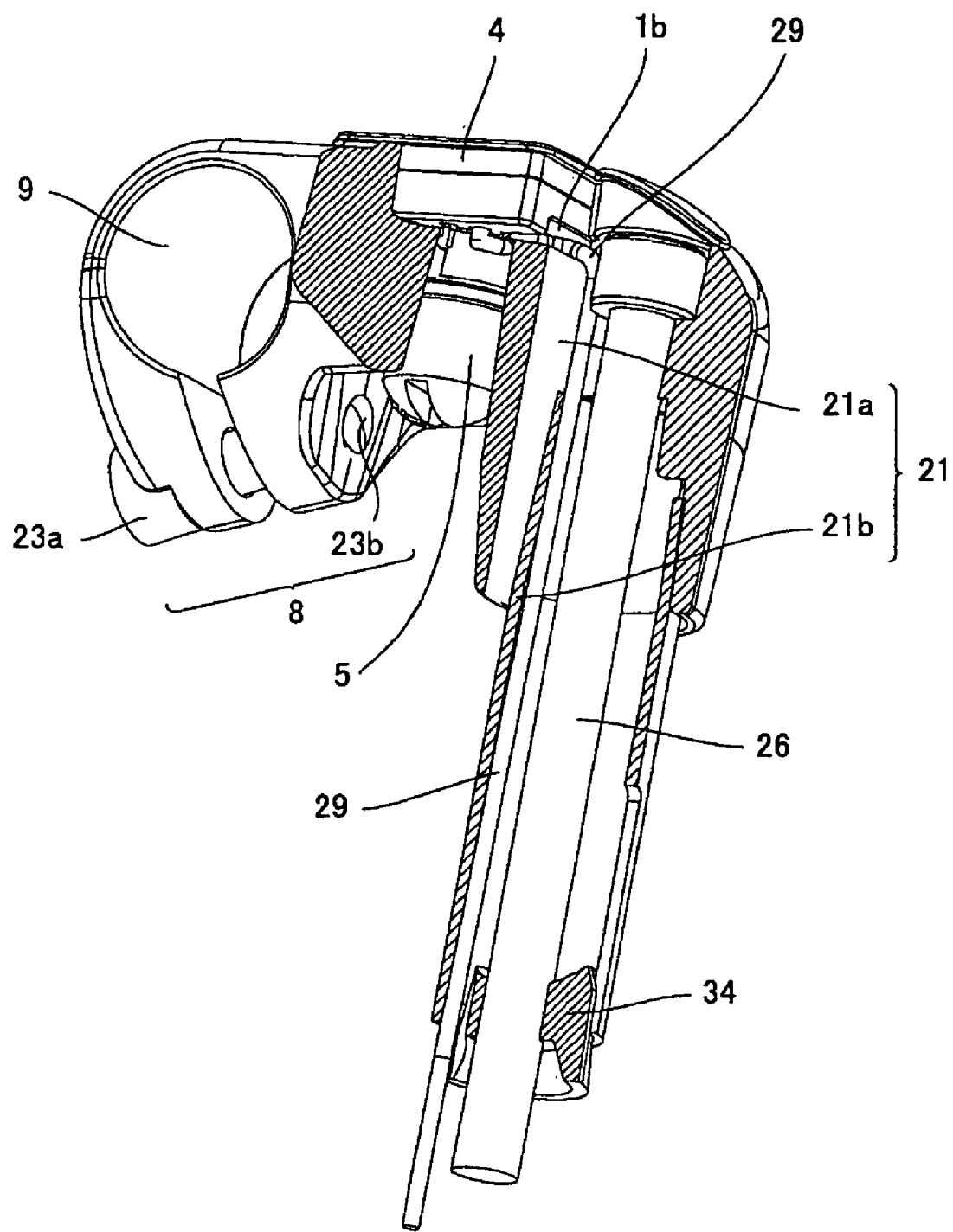
FIG. 7 is a perspective, partial cross section of the FIG. 2 handlebar stem for illustrating a route of a lead.

FIG. 7 is a perspective, partial cross section showing a recess provided in the speed indicator housing 1 and the rod 21 to pass lead 29 extracted from the speed indicator's main body 4. In FIG. 7, lead 29 is extracted from the main body's bottom surface and passes through recess 1b and is passed through a gap formed between elongate, hollow portion 21 and bar 26. Such a recess allows a small space to be used to pass the lead into the rod.

Figure 8:
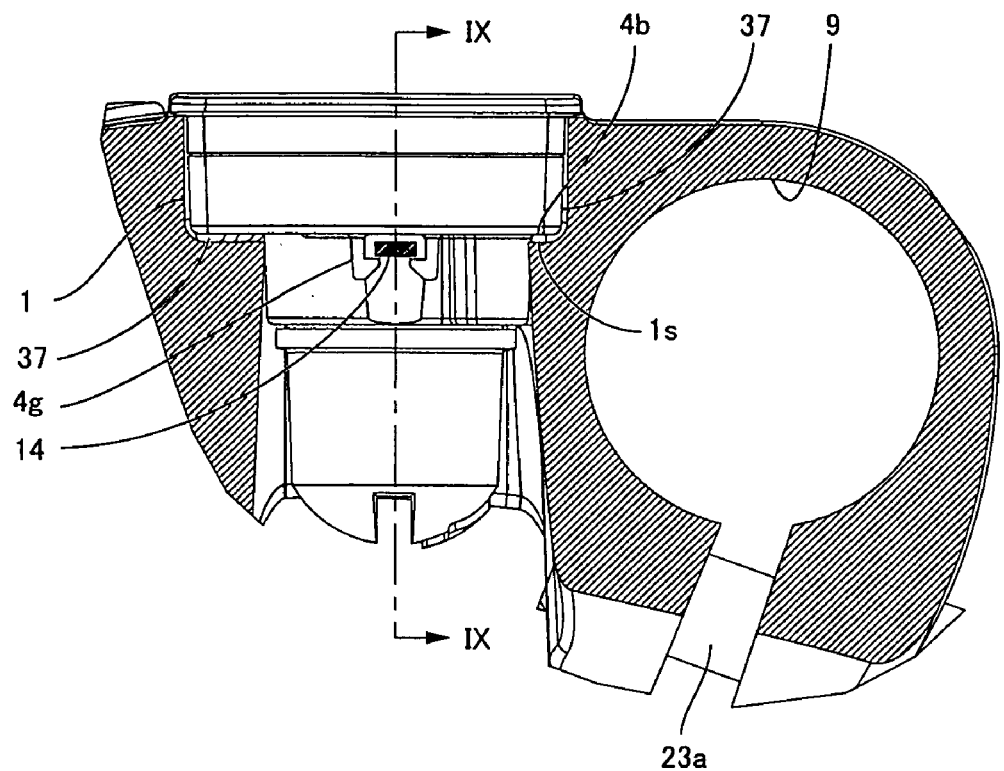
FIG. 8 is a partial cross section for illustrating a mechanism preventing a speed indicator in the FIG. 2 handlebar stem from slipping off.

With reference to FIG. 8, a pair of nails for engagement 4g is arranged a bottom surface of the main body of the speed indicator to extend downward and face each other. Each nail has a barb engaged with a protrusion 14 of the speed indicator housing to prevent the speed indicator from slipping off. Furthermore, the speed indicator's main body has bottom portion 4b facing a step 1s of the speed indicator housing and bonded with an adhesive 37. The adhesive is also applied on a side surface of main body 4 for bonding to the speed indicator housing.

Figure 9:
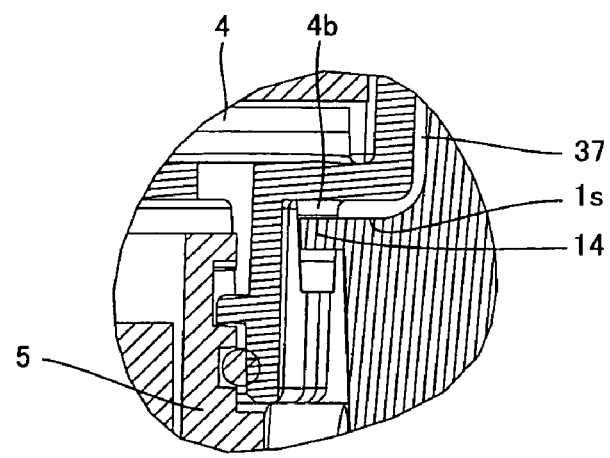
FIG. 9 is a cross section taken along a line IX—IX of FIG. 8.
Figure 10:
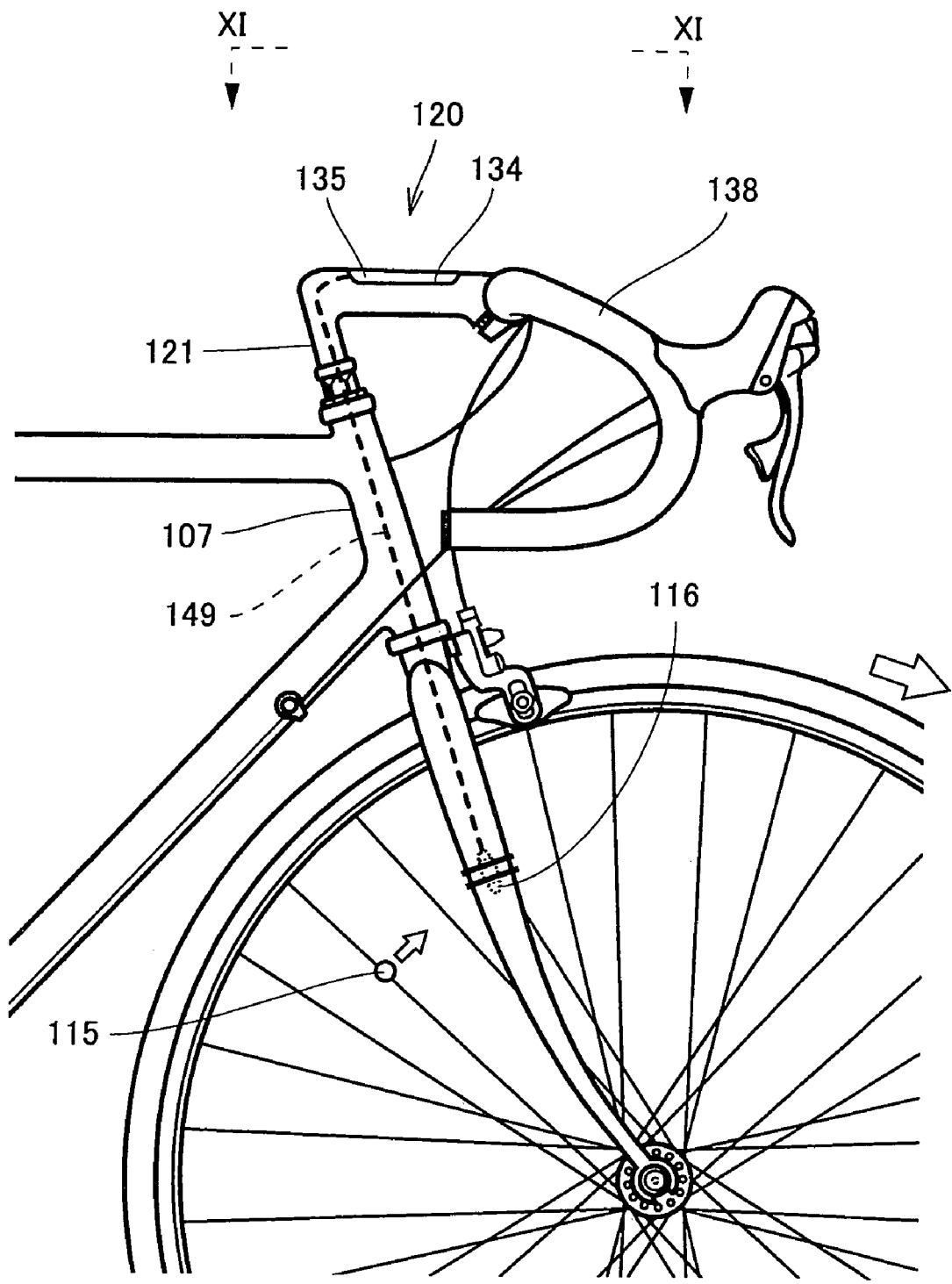
FIG. 10 shows a bicycle having a conventional handlebar stem attached thereto.
Figure 11:
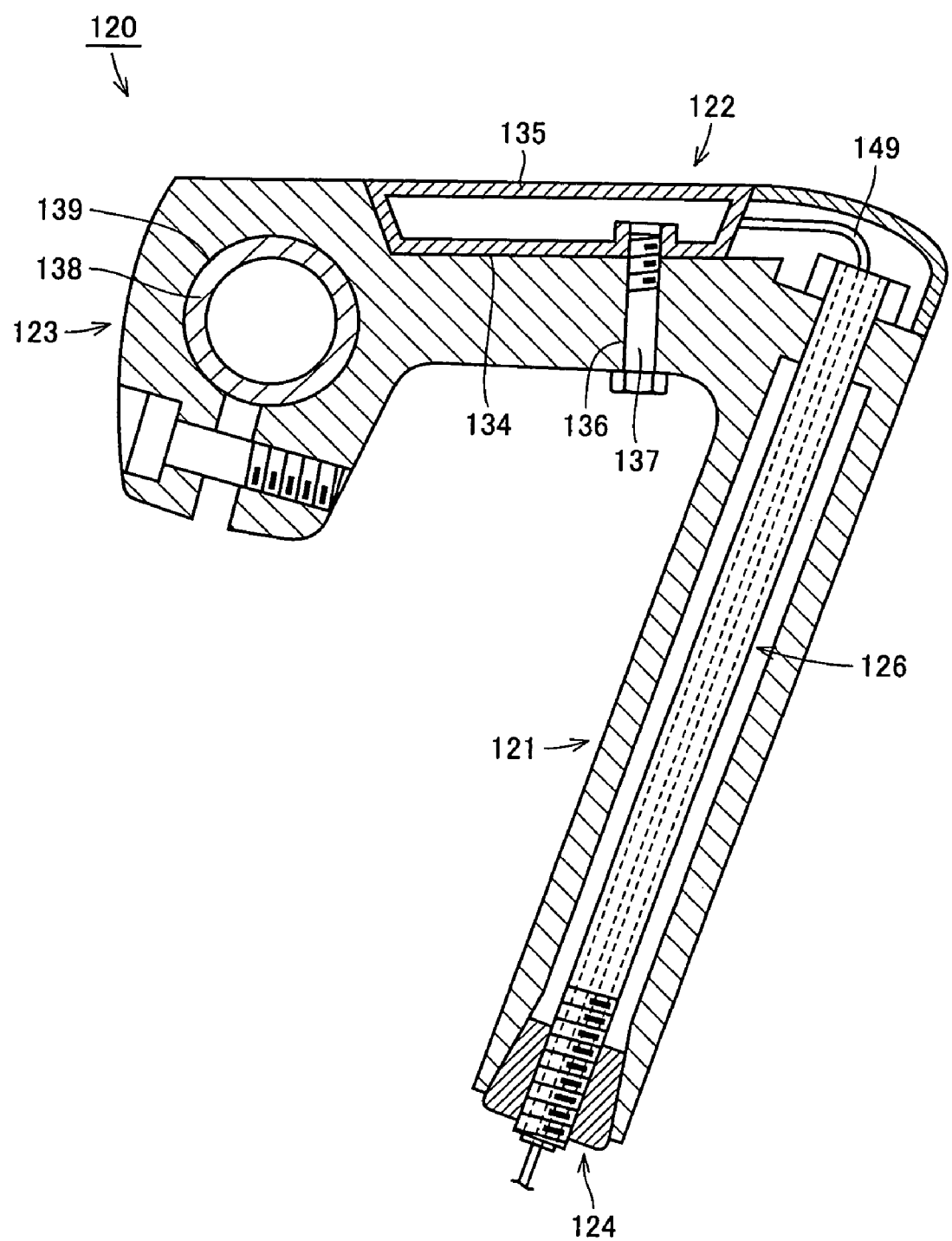
FIG. 11 is a cross section of a conventional handlebar stem.

As shown in FIG. 9, which is a cross section taken along a line IX—IX of FIG. 8, protrusion 14 protrudes from step 1s inwards. In front of and behind the protrusion the pair of nails for engagement is located to sandwich the protrusion for engagement therewith to prevent the speed indicator from slipping off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A handlebar stem (10) attaching a handlebar of a bicycle, comprising:
   a rod (21) attaching said handlebar stem to the bicycle;
   a speed indicator (3) receiving a signal from a speed sensor to display speed; and
   An indicator housing (1) located at a front protrusion (6) extending in a forward direction to traverse said rod to house said speed indicator, said indicator housing, as seen along said rod, overlapping or being adjacent to said rod 4, said indicator housing having a protrusion

(14) to engage with and secure said speed indicator and said speed indicator has a nail (4g) elastically deformed to engage with said protrusion (4).

2. The handlebar stem of claim 1, wherein a handlebar holder (8) holding said handlebar and said indicator housing (1) are adjacent to each other and a screw (23a) fastening said handlebar held by said handlebar holder is obliquely arranged to traverse said forward direction.

3. The handlebar stem of claim 1, wherein said speed indicator (3) is bonded to said indicator housing with an adhesive.

4. A handlebar stem (10) attaching a handlebar of a bicycle, comprising:
   a rod (21) attaching said handlebar stem to the bicycle;
   a speed indicator (3) receiving a signal from a speed sensor to display speed; and
   an indicator housing (1) located at a front protrusion (6) extending in a forward direction to traverse said rod to house said speed indicator, said indicator housing, as seen along said rod, overlapping or being adjacent to said rod 4, said speed indicator including a main body having an interconnect substrate and an indication unit, and a battery housing (5) removable from said main body, said indicator housing (1) having a through-hole (1a) opening downward, said battery housing is arranged through said through-hole and protrude therefrom downward, and said through-hole has an edge provided with a guiding tapered portion (17) helping to use a tool in a form of a pin to push upward a push button switch (4f) provided at a bottom surface of said main body while said speed indicator is housed.

5. A speed indicator attached to a handlebar stem of a bicycle, comprising a main body (4) including an interconnect substrate and a liquid crystal display unit, and a battery housing (5) removable from said main body, wherein any button switch (4f) of said main body to be externally operated is arranged only at a bottom surface of said main body.

* * * * *